US012054165B2

(12) United States Patent
Taie et al.

(10) Patent No.: US 12,054,165 B2
(45) Date of Patent: Aug. 6, 2024

(54) VEHICLE LOCALIZATION

(71) Applicant: JAGUAR LAND ROVER LIMITED, Coventry (GB)

(72) Inventors: Mostafa Taie, Warwick (GB); Charles Marshall, Coventry (GB)

(73) Assignee: Jaguar Land Rover Limited, Coventry (GB)

(*) Notice: Subject to any disclaimer, the term of this patent is extended or adjusted under 35 U.S.C. 154(b) by 116 days.

(21) Appl. No.: 17/602,566

(22) PCT Filed: Apr. 7, 2020

(86) PCT No.: PCT/EP2020/059838
§ 371 (c)(1),
(2) Date: Oct. 8, 2021

(87) PCT Pub. No.: WO2020/207996
PCT Pub. Date: Oct. 15, 2020

(65) Prior Publication Data
US 2022/0185300 A1    Jun. 16, 2022

(30) Foreign Application Priority Data
Apr. 8, 2019 (GB) ...................... 1904966

(51) Int. Cl.
*B60W 50/029* (2012.01)
*B60R 16/033* (2006.01)
(Continued)

(52) U.S. Cl.
CPC ......... *B60W 50/029* (2013.01); *B60R 16/033* (2013.01); *B60W 30/12* (2013.01);
(Continued)

(58) Field of Classification Search
None
See application file for complete search history.

(56) References Cited

U.S. PATENT DOCUMENTS 8,798,841 B1    8/2014   Nickolaou et al.
9,731,728 B2 *  8/2017   Nguyen Van ............. G01S 7/40
(Continued)

FOREIGN PATENT DOCUMENTS

| CN | 102649430 A | 8/2012 |
| CN | 107499309 A | 12/2017 |
| DE | 102017204603 A1 | 9/2018 |

OTHER PUBLICATIONS

International Search Report corresponding to International Application No. PCT/EP2020/059838, dated Jul. 6, 2020, 5 pages.
(Continued)

*Primary Examiner* — Todd Melton
(74) *Attorney, Agent, or Firm* — Reising Ethington P.C.

(57) ABSTRACT

Aspects of the present invention relate to a control system for a host vehicle, vehicle comprising the control system and a method for estimating a lateral position of a host vehicle. The host vehicle comprises a first sensor arrangement disposed at a first orientation relative to the host vehicle and at least one additional sensor arrangement, each additional sensor arrangement being disposed at an orientation relative to the host vehicle that is different to the first orientation. First sensor information is received from the first sensor arrangement and additional sensor information is received from each additional sensor arrangement. A lateral position of the vehicle relative to a roadway is determined using the additional sensor information if all or part of the first sensor information is interrupted and an output is provided in dependence on the determined lateral position.

16 Claims, 8 Drawing Sheets

(51) Int. Cl.
    *B60W 30/12* (2020.01)
    *B60W 40/072* (2012.01)
    *B60W 50/14* (2020.01)
    *G01S 17/931* (2020.01)
    *G06V 20/56* (2022.01)

(52) U.S. Cl.
    CPC .......... *B60W 40/072* (2013.01); *B60W 50/14* (2013.01); *G01S 17/931* (2020.01); *G06V 20/588* (2022.01); *B60W 2420/403* (2013.01); *B60W 2420/408* (2024.01); *B60W 2422/90* (2013.01); *B60W 2422/95* (2013.01); *B60W 2552/30* (2020.02); *B60W 2552/53* (2020.02); *B60W 2554/801* (2020.02); *B60W 2556/40* (2020.02)

(56) References Cited

U.S. PATENT DOCUMENTS

| | | | |
|---|---|---|---|
| 10,210,406 B2* | 2/2019 | Huang | G01S 5/16 |
| 2007/0091173 A1 | 4/2007 | Kade et al. | |
| 2012/0221168 A1 | 8/2012 | Zeng et al. | |
| 2015/0151752 A1 | 6/2015 | Lee | |
| 2017/0270798 A1 | 9/2017 | Ushiba et al. | |
| 2017/0355366 A1* | 12/2017 | Prasad | B60W 30/12 |
| 2018/0086210 A1* | 3/2018 | Berels | B60L 1/00 |
| 2019/0100212 A1 | 4/2019 | Oh | |

OTHER PUBLICATIONS

Written Opinion corresponding to International Application No. PCT/EP2020/059838, dated Jul. 6, 2020, 6 pages.

Combined Search and Examination Report corresponding to Great Britain Applicarion No. GB 1904966.7, dated Sep. 23, 2019, 6 pages.

Jelena Frtunikj et al., "Adaptive Error and Sensor Management for Autonomous Vehicles: Model-Based Approach and Run-Time System", ROBOCUP 2008, dated Oct. 27, 2014, 14 pages.

Chinese Office Action corresponding to Chinese application 202080033295.6, dated Apr. 15, 2023, 15 pages.

European Office Action corresponding to application 20717186.9, dated Nov. 29, 2023, 4 pages.

* cited by examiner

VEHICLE LOCALIZATION

TECHNICAL FIELD

The present disclosure relates to vehicle localisation, particularly but not exclusively to lateral vehicle localisation. Aspects of the invention relate to a control system, to a vehicle, and to a method.

BACKGROUND

Vehicle localisation relates to the identification of a current location of a vehicle and finds particular utility in fields such as assisted or autonomous vehicle control. It can be of particular import to identify the lateral position of the vehicle relative to the roadway it is traversing. In some scenarios, this lateral localisation may include lane detection, localisation within a lane and lane number assignment processes.

Some existing approaches to the challenge of lateral localisation use one or more forward-facing sensors in order to detect lane markings or vehicles and localise the host vehicle within its lane and within the road by assigning lane number to it. This data is then used to calculate the path of the host/ego vehicle.

There are a number of scenarios in which the information available from such sensors can be degraded. This loss of information may be the result of sensor failure or some aspect of external conditions. For example, lane markings in front of the host vehicle may have faded or be blocked by other objects (such as vehicles in front of the host vehicle). One approach in such circumstances is to estimate a relevant localisation attribute (such as lane curvature) from past data, but this may imply a time delay as such a history is generated. Alternatively, the host vehicle may choose to follow the path of the preceding vehicle, but this may propagate errors in control of the preceding vehicle to the host vehicle.

In circumstances in which the forward-facing sensors provide no data at all, the problem can be even more acute. Sensors may be effectively blinded (for example, cameras due to sunlight or lidar sensors due to dirt buildup) or may be subject to technical failure (in sensor itself or in the power supply).

It is an aim of the present invention to address one or more of the disadvantages associated with the prior art.

SUMMARY OF THE INVENTION

Aspects and embodiments of the invention provide a control system, a vehicle and a method as claimed in the appended claims According to an aspect of the present invention there is provided a control system for a host vehicle, the host vehicle comprising a first sensor arrangement disposed at a first orientation relative to the host vehicle and at least one additional sensor arrangement, each additional sensor arrangement being disposed at an orientation relative to the host vehicle that is different to the first orientation, the control system being configured to: receive first sensor information from the first sensor arrangement; receive additional sensor information from each additional sensor arrangement; determine a lateral position of the vehicle relative to a roadway using the additional sensor information if all or part of the primary sensor information is interrupted; and provide an output in dependence on the determined lateral position.

According to a further aspect of the present invention, there is provided a vehicle comprising the control system, first sensor arrangement and additional sensor arrangement.

According to a further aspect of the present invention, there is provided a method for estimating a lateral position of a host vehicle, the host vehicle comprising a first sensor arrangement disposed at a first orientation relative to the host vehicle and at least one additional sensor arrangement, each additional sensor arrangement being disposed at an orientation relative to the host vehicle that is different to the first orientation, the method comprising, at a control system: receiving first sensor information from the first sensor arrangement; receiving additional sensor information from each additional sensor arrangement; determining a lateral position of the vehicle relative to a roadway using the additional sensor information if the first sensor information is interrupted; and providing an output in dependence on the determined lateral position. There may also be provided a non-transitory computer readable medium comprising computer readable instructions that, when executed by a processor, cause performance of the method.

These aspects can utilise information from additional sensor arrangements orientated differently to a first sensor arrangement to calculate the lateral position of a host vehicle if the first sensor arrangement is not able to provide all or part of the sensor information required. This may particularly improve lateral localisation in circumstances in which the one or more sensors of the first sensor arrangement are not operating optimally, for example due to external conditions or sensor failure. Since the additional sensor arrangements are not orientated in the same direction as the first sensor arrangement, it may be less likely that problems affecting the first sensor arrangement will also be reflected in data from the additional sensor arrangements.

In some embodiments, the one or more controllers collectively comprise: at least one electronic processor having an electrical input for receiving signals; and, at least one electronic memory device electrically coupled to the at least one electronic processor and having instructions stored therein; and wherein the at least one electronic processor is configured to access the at least one memory device and execute the instructions thereon so as to cause the control system to: receive first sensor information from the first sensor arrangement; receive secondary sensor information from each additional sensor arrangement; determine a lateral position of the vehicle relative to a roadway using the additional sensor information if all or part of the first sensor information is interrupted; and provide an output in dependence on the determined lateral position.

In an embodiment, the control system comprises one or more processors, the first sensor arrangement comprises one or more sensors aligned with the first orientation and each additional sensor arrangement comprises one or more sensors aligned at an orientation different to the first orientation. In some embodiments, all sensors in a given additional sensor arrangement are aligned at the same orientation.

In some embodiments, the control system is further configured to determine the lateral position of the vehicle relative to the roadway from the additional sensor information in conjunction with the primary sensor information if the first sensor information is available. This may improve a calculation of the lateral position of the vehicle in comparison with using the first sensor information alone. In other embodiments, where the first sensor information is available, the control system may use the first sensor information alone to calculate the lateral position.

Optionally, at least one additional sensor arrangement is disposed at an orientation opposite to the first orientation. For example, the first orientation may be forward facing relative to the host vehicle. In such circumstances, at least one additional sensor arrangement may be rearward facing relative to the vehicle.

Optionally, the output of the control system is a control output for controlling a position of the host vehicle. Alternatively or additionally, the output may be provided to a human-machine interface (HMI). For example, the output may provide an indication of the functionality of the sensor arrangements, and the HMI may provide an indication that one or more sensor arrangements requires servicing if they are not functioning adequately.

In some embodiments, the host vehicle comprises at least two additional sensor arrangements. Optionally, at least one additional sensor arrangement is leftward facing relative to the vehicle and at least one additional sensor arrangement is rightward facing relative to the vehicle.

Optionally, the control system is configured to determine a position of the host vehicle relative to one or more lanes of the roadway. For example, the control system may determine in which lane of the roadway the vehicle is located and/or may determine a position of a vehicle within a lane of the roadway.

Optionally, the control system is configured to determine the lateral position of the vehicle by estimating curvature of one or more environmental elements. For example, the one or more environmental elements comprise lane markings. Such elements may be present in the fields of view of both the primary and secondary sensor arrangements, meaning that interpolation of a feature such as a lane may be improved by reference to both first and additional sensor arrangements.

In some embodiments, the control system is further configured to receive map information describing the environment of the host vehicle, and wherein the control system is configured to determine the lateral position of the vehicle on a route in dependence on the map information. The map information may be used in combination with the primary and secondary sensor information.

Optionally, at least one of the sensor arrangements comprises a plurality of sensors. Optionally, at least one of the sensor arrangements comprises a lidar sensor. Optionally, at least one of the sensor arrangements comprises a camera. For example, in some embodiments, at least one of the sensor arrangements may comprise a camera and a lidar sensor.

Optionally, the vehicle comprises independent power supplies provided for primary and secondary sensors within each sensor arrangement. As such, failure of a single power supply need not prevent determination of the lateral position. In some embodiments, the control system comprises a plurality of interface elements, each interface element being communicatively coupled to primary and secondary sensors within each sensor arrangement. Again, this may provide for redundancy.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
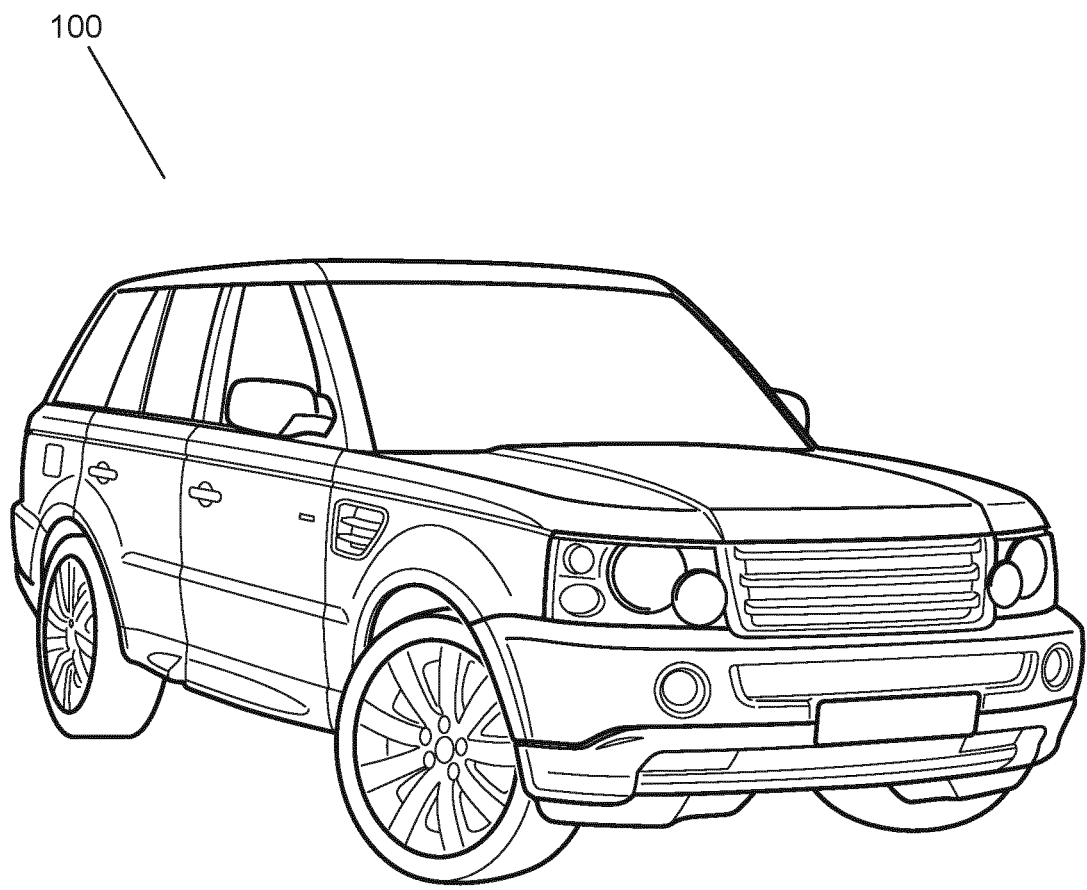
FIG. 1 shows a vehicle in accordance with an embodiment of the invention.
Figure 2:
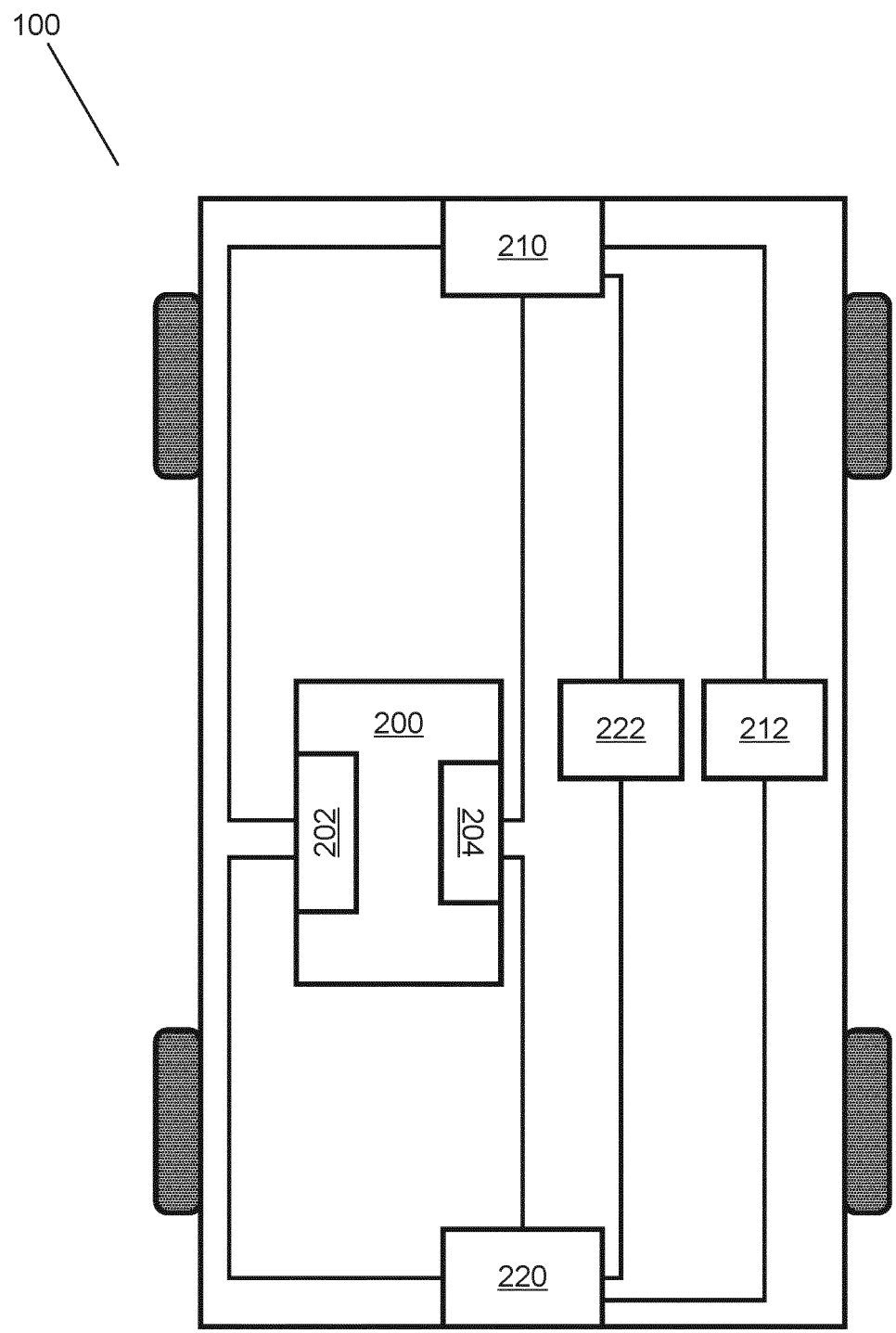
FIG. 2 shows a schematic representation of the vehicle of FIG. 1, illustrating elements utilised for localisation of the vehicle.

A vehicle 100 in accordance with an embodiment of the present invention is described herein with reference to the accompanying FIGS. 1 and 2.

With reference to FIG. 2, the vehicle 100 comprises a control system 200. The vehicle further comprises a first sensor arrangement 210 and one or more additional sensor arrangements 220. The first sensor arrangement 210 and each additional sensor arrangement 220 are communicatively coupled to the control system 200. A wired or wireless connection between the sensor arrangements 210, 220 and the control system 200 may be provided to effect this communication.

As described, the sensor arrangements 210, 220 are grouped by orientation. However, control and power of sensors within each arrangement may be grouped alternatively. For example, within each sensor arrangement 210, 220 there may be provided one or more primary sensors of a primary sensor system and one or more secondary sensors of a secondary sensor system.

The vehicle also comprises primary power supply 212 and one or more secondary power supplies 222. The primary power supply 212 is coupled to the sensors within the sensor arrangements 210, 220 that are part of the primary sensor system in order to provide power thereto. Similarly, the one or more secondary power supplies 222 are coupled to the sensors within the sensor arrangements 210, 220 that are part of the secondary sensor system in order to provide power thereto. Since sensors the secondary sensor system are not dependent upon the same power supply as the primary sensor system, the chance of simultaneous power loss to both sensor systems is reduced.

The control system 200 may be implemented using one or more processors. The control system may also comprise data storage. The control system 200 of the illustrated embodiments comprises interfaces 202, 204 to facilitate communication with the sensors of the primary sensor system and those of the secondary sensor system. As such, there are provided separate network connections for the sensors of the primary sensor system and sensors of the secondary sensor system. This can reduce the risk of simultaneous loss of data from both sensor systems to the control system 200.

The control system 200 is configured to receive data from the sensor arrangements 210, 220 and process this to determine a localisation, such as a lateral localisation, of the vehicle 100. In particular, the control system 200 may determine a lateral position of the vehicle 100 on a roadway. The control system 200 may utilise the output of this determination to control the vehicle 100 and/or to provide feedback to an occupant of the vehicle 100 through a human machine interface (HMI). The control system 200 may also provide information to one or more remote servers where appropriate.

In the embodiment illustrated in FIG. 2, the first sensor arrangement 210 and each additional sensor arrangement each comprise a plurality of sensors. In particular, each sensor arrangement 210, 220 comprises at least a camera and one or more lidar sensors. The cameras of each sensor arrangement may, for example, for the sensors of the primary sensors system while the lidar sensors may form the sensors of the secondary sensory system.

The first sensor arrangement 210 has a first orientation. In the preferred embodiment, this orientation is forward facing. That is to say, the sensors of the first sensor arrangement 210 are forward facing. Accordingly, they have a field of view centred on the usual direction of travel of the vehicle.

Each additional sensor arrangement 220 has an orientation different to the first orientation. Accordingly, the orientations of the sensors in the additional sensor arrangements 220 are different to those of the first sensor arrangement 210. In FIG. 2, for example, the illustrated additional sensor arrangement 220 is rearward facing, and thus the fields of view of the sensors of this additional sensor arrangement 220 is centred opposite to the usual direction of travel of the vehicle 100.

Alternative relative orientations of the sensor arrangements 210, 220 may be adopted. In general, however, the orientation of each additional sensor arrangement 220 is substantially different to that of the first orientation of the first sensor arrangement 210. For example, the orientation of each additional sensor arrangement 220 may at an angle of at least 45 degrees, preferably at least 90 degrees to the first orientation. This may ensure that sensors of the additional sensor arrangements 220 have a substantially different field of view to equivalent sensors of the first sensor arrangement 210.

Figure 3:
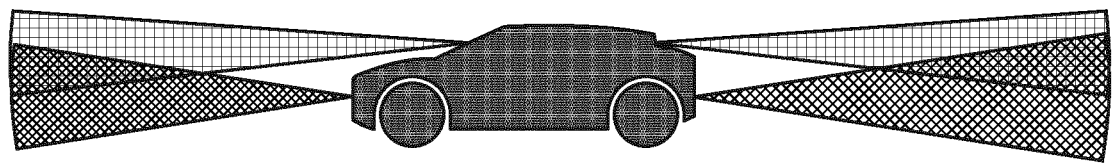
FIG. 3 illustrates exemplary vertical fields of view for sensors of the vehicle.
Figure 4:
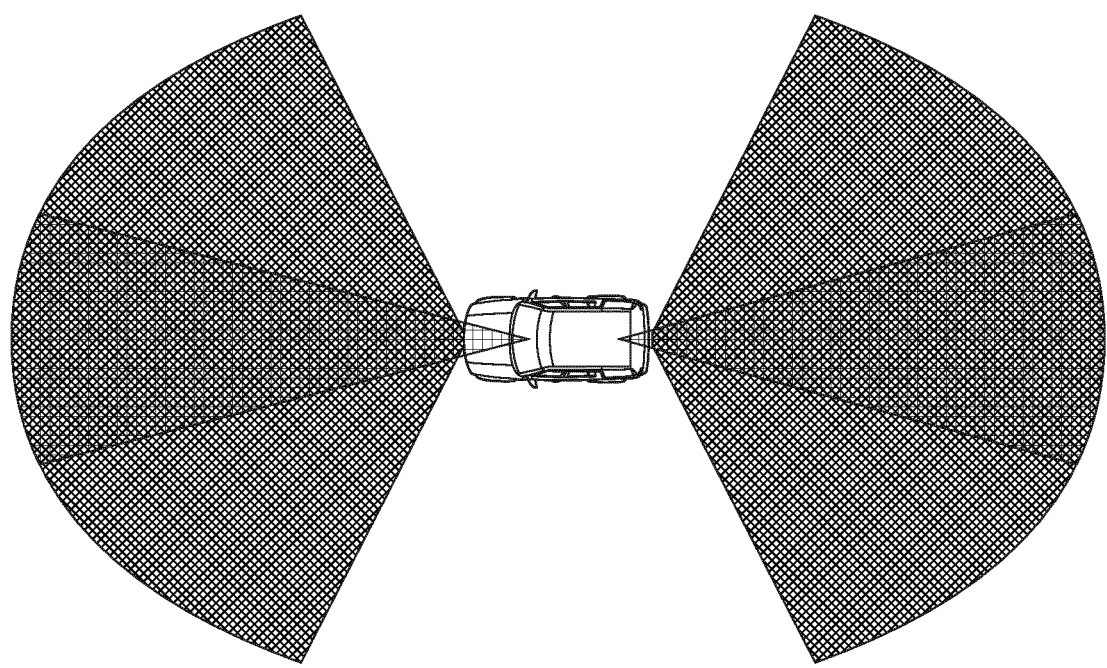
FIG. 4 illustrates exemplary horizontal fields of view for the sensors.
Figure 5:
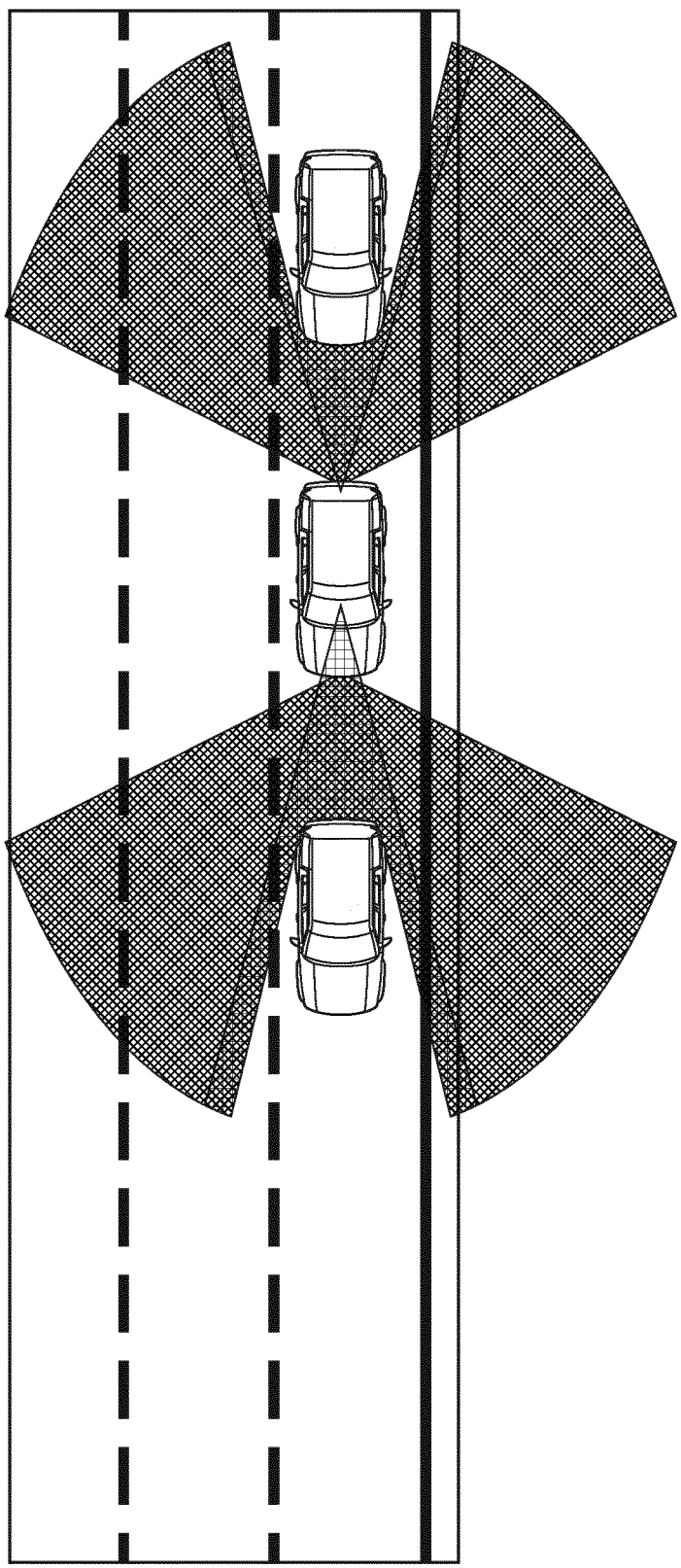
FIG. 5 illustrates fields of view on a roadway with other vehicles.

This can further understood with reference to FIGS. 3 and 4, which shows a side view and plan view of the fields of view of the sensors within the forward facing first sensor arrangement 210 and rear-facing additional sensor arrangement 220 of the vehicle 100 illustrated in FIG. 2. Each sensor arrangement comprises a camera sensor mounted near the top of the vehicle, and a lidar sensor mounted in the bumper. Spatially displacing the sensors can reduce the probability of both sensors being obstructed or damaged in the same instance. As can be seen from FIG. 4, for example, the lidar sensor may have a wider field of view than the camera sensor. As illustrated in FIG. 5, this may be of particular benefit where other vehicles are in close proximity to host vehicle 100 as, for example, lane marking may be obscured for the camera sensors.

Figure 6:
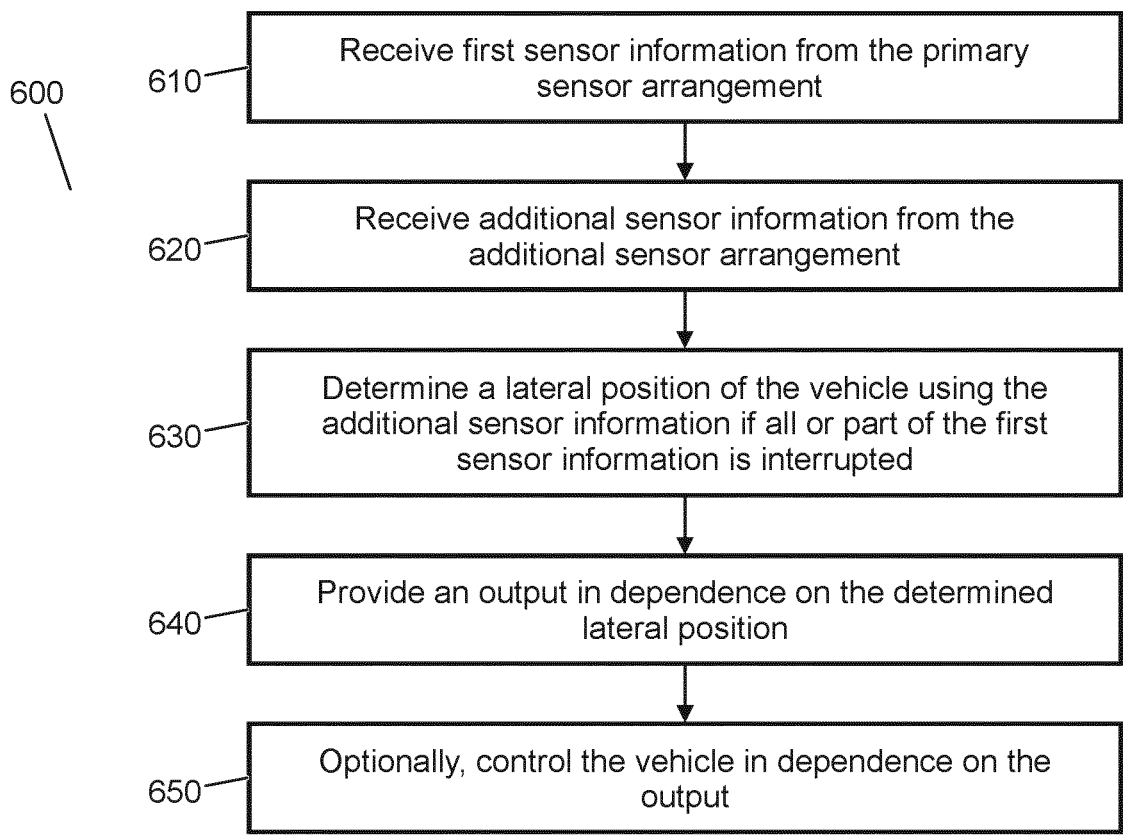
FIG. 6 shows a flow diagram of a method for estimating the lateral position of a host vehicle in accordance with an embodiment of the invention.

In use, the control system 200 may perform the method 600 illustrated in FIG. 6. Method 600 is a method for estimating a lateral position of the host vehicle 100, the host vehicle comprising a first sensor arrangement 210 disposed at a first orientation relative to the host vehicle 100 and at least one additional sensor arrangement 220, each additional sensor arrangement 220 being disposed at an orientation relative to the host vehicle 100 that is different to the first orientation.

The method comprises receiving 610 first sensor information from the primary sensor arrangement 210 and receiving 620 additional sensor information from the additional sensor arrangement 220. The control system then determines 630 a lateral position of the vehicle 100 from this sensor information, in particular modifying an estimate of lateral position on a roadway that would have been derivable from the first sensor information alone by utilising the additional sensor information. Where all or part of the first sensor information is unavailable (for example, due to failure of one or more sensors within the first sensor arrangement 210) the lateral position may be determined from the additional sensor information together with any remaining sensor information from the first sensor arrangement 210. The method then comprises the control system 200 providing 640 an output in dependence on the determined lateral position. Optionally, the method may further comprise controlling 650 the vehicle 100 in dependence on the output. As noted previously, the method may alternatively or additional comprise providing feedback to an occupant of the vehicle 100 through a human machine interface (HMI) in dependence on the output. The control system 200 may also provide information to one or more remote servers where appropriate.

Figure 7:
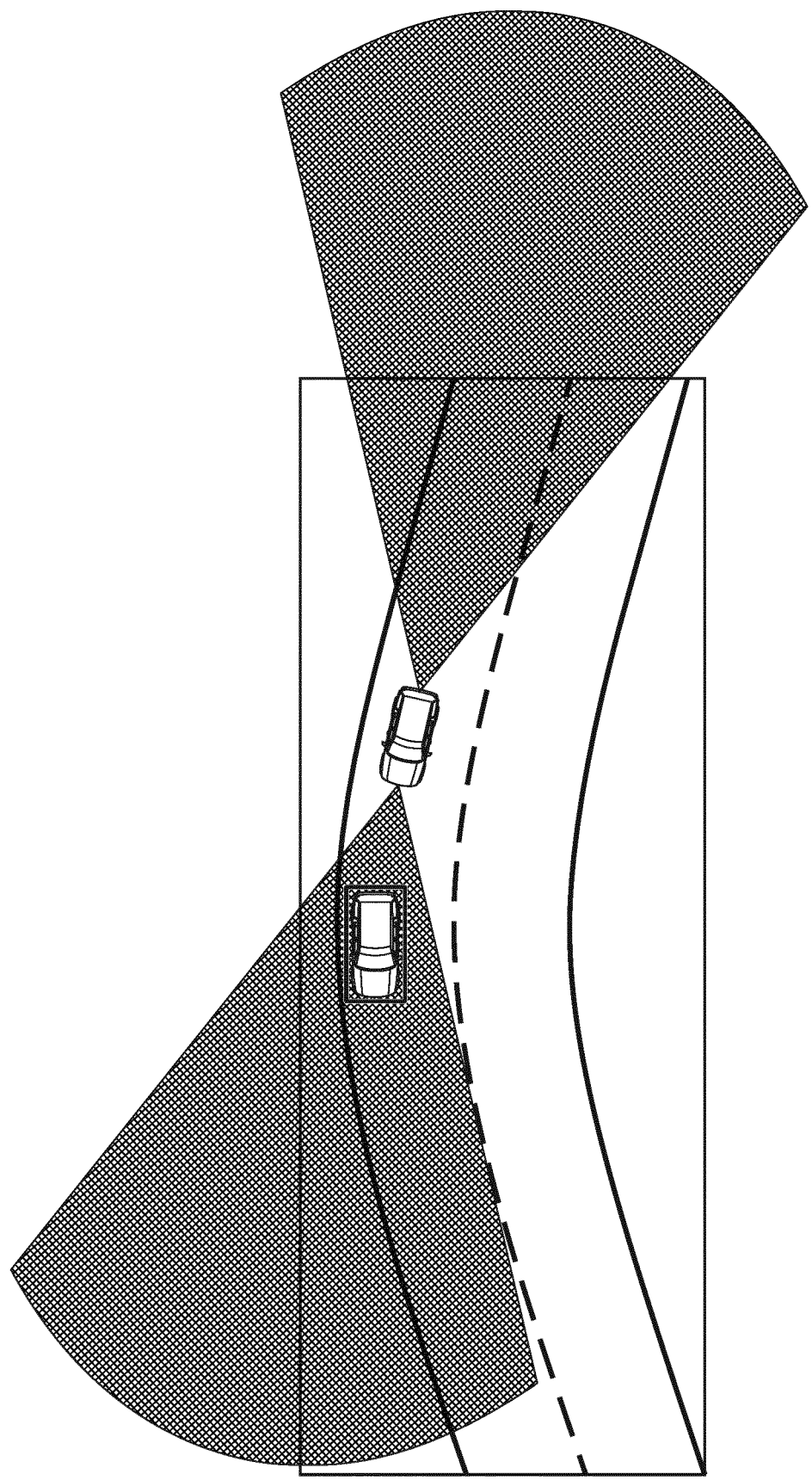
FIG. 7 illustrates fields of view on a curved roadway.

In order to determine the lateral position of the vehicle relative to the roadway, the control system 200 continuously determines the curvature of lane markings visible to the sensor arrangements 210, 220. As can be seen form FIG. 7, even in circumstances in which all sensors are functioning normally it may be that there is limited information that can be derived regarding the lane markings from the forward facing first sensor arrangement 210. To alleviate this limitation on an estimate of curvature derived solely from the first sensor information, the lane information from the additional sensor information is used in conjunction with the first sensor information in order to estimate the curvature of the lanes. That is, by using the additional sensor information there may be a greater number of points available for use with a line fitting algorithm.

The support of the additional sensor arrangement together with the first sensor arrangement can increase the accuracy and robustness of lateral localisation and lane detection in a number of scenarios. For example, by improving the lane curvature estimate as identified above or by improving lateral localisation when information is obscured, such as when: road lines are faded or obscured due to weather conditions, the field of view (FoV) of the front sensors is partially or fully obstructed or lane markings would otherwise be obscured from the front sensors due to traffic. The use of the additional sensor information can also provide further pertinent detail that might not be otherwise available, such as in lane merging situations (see, for example, FIG. 9).

As well as working in conjunction with the first sensor information where available, the use of additional sensor information can allow lateral localisation where all or part of the first sensor information is interrupted. For example, it may allow the vehicle to maintain lane position in the case of: blinding of front sensors; software or hardware failure of one or more front sensors; network failure to one or more front sensors; the loss of power to one or more of the front sensors; damage to the front sensor arrangement 210 due to road debris or other impacts; limitations on the front sensors due other environmental conditions and/or dirt build up on the sensors.

When all or part of the information from the first sensor arrangement is lost, the control system 200 may predict the curvature of the lane ahead of the vehicle by fitting a curve to lane points detected by each additional sensor arrangement 220 and may therefore estimate the lane curvature ahead. Since the additional sensor arrangement 220 remains operational, the control system continues to have real time information rather than relying on historical data.

To supplement the information from first sensor arrangement 210 and each additional sensor arrangement 220, the control system may also have access to map information and information from a positioning system such as GPS.

Figure 8:
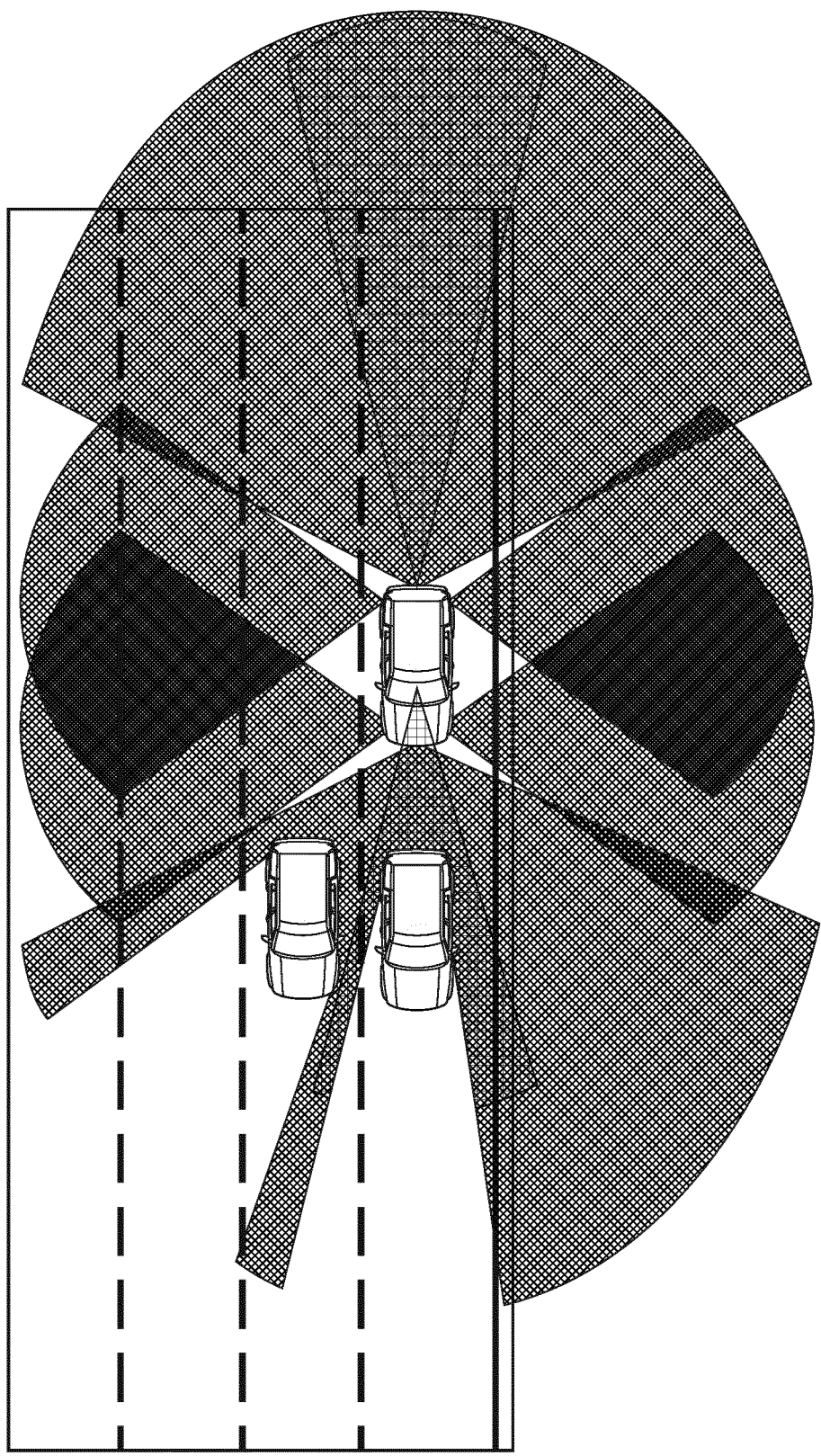
FIG. 8 illustrates an alternative example set of horizontal fields of view.
Figure 9:
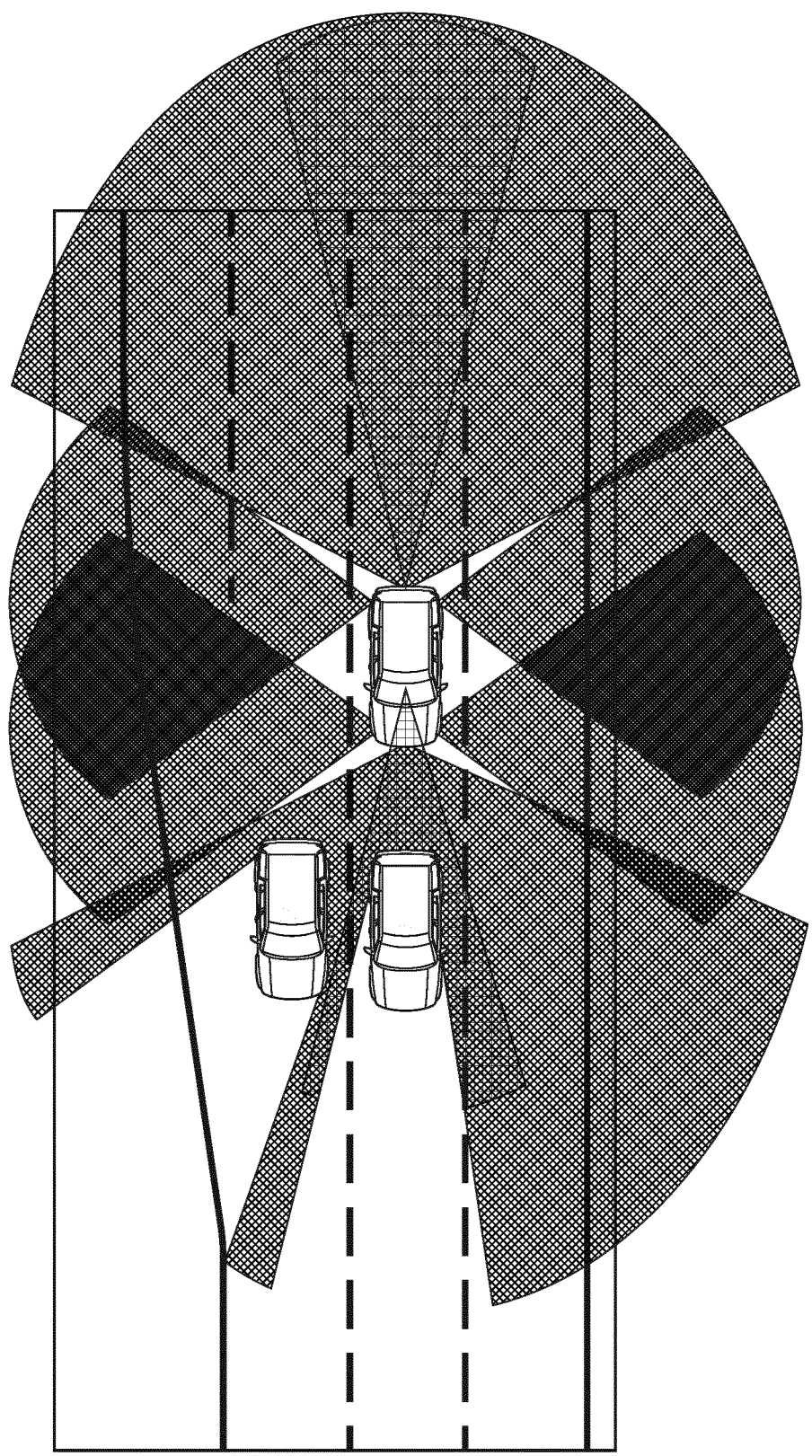
FIG. 9 illustrates the fields of view of FIG. 8 in a scenario in which lanes of a roadway merge.

FIGS. 8 and 9 illustrate the use of further additional sensor arrangements. In this case, the further additional sensor arrangements are side-facing (i.e. face left and right of the vehicle's usual direction of travel). Although shown in addition to the rear-facing additional sensor arrangement 220, the side-facing additional sensor arrangements could be used as an alternative.

FIG. 8 illustrates the multiple obstacles may block the fields of view of the first sensor arrangement, while a far more detailed understanding of the environment may be obtained from side- and rear-facing sensors in this circumstance. FIG. 9 further illustrate that such additional sensor arrangements may be of particular use in complex lane scenarios, such as during (forced) lane mergers or similar. Again, the use of additional sensor information may improve a lateral localisation that would be possible from the primary sensor arrangement alone, It will be appreciated that various changes and modifications can be made to the present invention without departing from the scope of the present application.

The invention claimed is:

1. A vehicle comprising a control system, the vehicle comprising a first sensor arrangement disposed at a first orientation relative to the host vehicle and at least one secondary sensor arrangement, each additional sensor arrangement being disposed at an orientation relative to the host vehicle that is different to the first orientation, the control system having one or more controllers configured to:
   receive first sensor information from the first sensor arrangement;
   receive secondary sensor information from each additional sensor arrangement;
   determine a lateral position of the vehicle relative to a roadway using the additional sensor information if all or part of the first sensor information is interrupted; and
   provide an output in dependence on the determined lateral position;
   wherein each sensor arrangement comprises a primary sensor which is part of a primary sensor system and a secondary sensor which is part of a secondary sensor system; and
   wherein a primary power supply is provided to power the primary sensor of both the first and each additional sensor arrangement, and a secondary power supply is provided to power the secondary sensor of both the first and each additional sensor arrangement, wherein the primary power supply and the secondary power supply are independent of each other such that the primary power supply does not supply power to the secondary sensor system and the secondary power supply does not supply power to the primary sensor system.

2. The vehicle of claim 1 wherein the one or more controllers collectively comprise:
   at least one electronic processor having an electrical input for receiving signals; and,
   at least one electronic memory device electrically coupled to the at least one electronic processor and having instructions stored therein;
   and wherein the at least one electronic processor is configured to access the at least one memory device and execute the instructions thereon so as to cause the control system to:
   receive first sensor information from the first sensor arrangement;
   receive secondary sensor information from each additional sensor arrangement;
   determine a lateral position of the vehicle relative to a roadway using the additional sensor information if all or part of the first sensor information is interrupted; and
   provide an output in dependence on the determined lateral position.

3. The vehicle according to claim 1, wherein the first sensor arrangement comprises one or more sensors aligned with the first orientation and each additional sensor arrangement comprises one or more sensors aligned at an orientation different to the first orientation.

4. The vehicle according to claim 1, wherein the control system is further configured to determine the lateral position of the vehicle relative to the roadway from the additional sensor information in conjunction with the first sensor information if the first sensor information is available.

5. The vehicle according to claim 1, wherein at least one additional sensor arrangement is disposed at an orientation opposite to the first orientation.

6. The vehicle according to claim 1, wherein the first orientation is forward facing relative to the host vehicle.

7. The vehicle according to claim 1, wherein the output of the control system is a control output for controlling a position of the host vehicle.

8. The vehicle according to claim 1, comprising at least one additional sensor arrangement that is leftward facing relative to the vehicle and at least one additional sensor arrangement that is rightward facing relative to the vehicle.

9. The vehicle according to claim 1, wherein the control system is configured to determine a position of the host vehicle relative to one or more lanes of the roadway.

10. The vehicle according to claim 1, wherein the control system is configured to determine the lateral position of the vehicle by estimating curvature of one or more environmental elements.

11. The vehicle according to claim 10, wherein the one or more environmental elements comprise lane markings.

12. The vehicle according to claim 1, wherein the control system is further configured to receive map information describing the environment of the host vehicle, and wherein the control system is configured to determine the lateral position of the vehicle on a route in dependence on the map information.

13. The vehicle according to claim 1, wherein at least one of the sensor arrangements comprises a lidar sensor and/or a camera.

14. The vehicle according to claim 1, wherein the control system comprises a plurality of interface elements, each interface element being communicatively coupled to primary and secondary sensors within each sensor arrangement.

15. A method for estimating a lateral position of a host vehicle, the host vehicle comprising a first sensor arrangement disposed at a first orientation relative to the host vehicle and at least one additional sensor arrangement, each additional sensor arrangement being disposed at an orientation relative to the host vehicle that is different to the first orientation, wherein each sensor arrangement comprises a primary sensor which is part of a primary sensor system and a secondary sensor which is part of a secondary sensor system, wherein a primary power supply is provided to power the primary sensor of both the first and each additional sensor arrangement, and a secondary power supply is provided to power the secondary sensor of both the first and each additional sensor arrangement, wherein the primary power supply and the secondary power supply are independent of each other such that the primary power supply does not supply power to the secondary sensor system and the secondary power supply does not supply power to the primary sensor system, the method comprising:

receiving first sensor information from the first sensor arrangement;

receiving additional sensor information from each additional sensor arrangement;

determining a lateral position of the vehicle relative to a roadway using the additional sensor information if all or part of the first sensor information is interrupted; and providing an output in dependence on the determined lateral position.

16. A non-transitory computer readable medium comprising computer readable instructions that, when executed by a processor, cause performance of the method of claim 15.

* * * * *